United States Patent
Guo et al.

(10) Patent No.: US 7,632,605 B2
(45) Date of Patent: Dec. 15, 2009

(54) ALKALINE CELL ANODE CASING

(75) Inventors: Jingdong Guo, Westlake, OH (US);
Jonathan W. Hedman, Burnt Hills, NY (US)

(73) Assignee: Eveready Battery Co., Inc., St. Louis, MO (US)

( * ) Notice: Subject to any disclaimer, the term of this patent is extended or adjusted under 35 U.S.C. 154(b) by 649 days.

(21) Appl. No.: 11/408,093

(22) Filed: Apr. 20, 2006

(65) Prior Publication Data

US 2006/0246353 A1 Nov. 2, 2006

Related U.S. Application Data

(60) Provisional application No. 60/676,114, filed on Apr. 29, 2005.

(51) Int. Cl.
 *H01M 4/66* (2006.01)
(52) U.S. Cl. .................... 429/245; 429/229
(58) Field of Classification Search ........... 429/175, 429/174, 163, 245, 176, 224, 219, 229, 220, 429/226
See application file for complete search history.

(56) References Cited

U.S. PATENT DOCUMENTS

| | | | |
|---|---|---|---|
| 2,495,247 A | 1/1950 | Friedman |
| 2,542,575 A | 2/1951 | Ruben |
| 2,542,710 A | 2/1951 | Ruben |
| 2,576,266 A | 11/1951 | Ruben |
| 3,657,018 A | 4/1972 | Ruetschi |
| 3,897,265 A | 7/1975 | Jaggard |
| 4,041,211 A | 8/1977 | Wiacek |
| 4,364,800 A | 12/1982 | Partridge |
| 4,791,036 A | 12/1988 | Schrenk et al. |
| 4,992,343 A | 2/1991 | Nardi |
| 5,188,869 A | 2/1993 | Getz et al. |
| 5,279,905 A | 1/1994 | Mansfield, Jr. et al. |

(Continued)

FOREIGN PATENT DOCUMENTS

EP  789407 A1  8/1997

(Continued)

OTHER PUBLICATIONS

Hull, et al., "Why Alkaline Cells Leak," J. Electrochem. Soc.:Electrochemical Science and Technology, Mar. 1977, pp. 332-339, vol. 124, No. 3.

(Continued)

*Primary Examiner*—Patrick Ryan
*Assistant Examiner*—Monique Wills
(74) *Attorney, Agent, or Firm*—Russell H. Toye, Jr.

(57) ABSTRACT

The invention is an electrochemical cell with a zinc-containing negative electrode, an aqueous alkaline electrolyte and a cup-shaped metal negative electrode casing in contact with the negative electrode. The negative electrode casing is formed from a substrate that is substantially free of copper and at least those portions of the surface of the negative electrode casing in the seal area and the current collector area are coated with a layer of an alloy comprising copper, tin and zinc. The alloy layer reduces hydrogen gassing within the cell and is particularly useful in cells with no added mercury. Embodiments of the invention include cells with prismatic, cylindrical and button shaped containers and cells with positive electrode active materials including manganese dioxide, silver oxide and oxygen.

31 Claims, 1 Drawing Sheet

U.S. PATENT DOCUMENTS

| | | | |
|---|---|---|---|
| 5,281,497 | A | 1/1994 | Kordesch et al. |
| 5,397,658 | A | 3/1995 | Dunham |
| 5,445,908 | A | 8/1995 | Inoue et al. |
| 5,567,538 | A | 10/1996 | Oltman et al. |
| 6,060,196 | A | 5/2000 | Gordon et al. |
| 6,197,445 | B1 | 3/2001 | Ward et al. |
| 6,372,381 | B1 | 4/2002 | Park et al. |
| 6,602,629 | B1 | 8/2003 | Guo et al. |
| 6,794,082 | B2 | 9/2004 | Mori et al. |
| 6,830,847 | B2 | 12/2004 | Ramaswami et al. |
| 2002/0150814 | A1 | 10/2002 | Causton et al. |
| 2003/0082456 | A1 | 5/2003 | Ho |
| 2003/0211387 | A1* | 11/2003 | Braunger et al. ............ 429/175 |
| 2004/0221446 | A1 | 11/2004 | Ohhara et al. |
| 2008/0160373 | A1* | 7/2008 | Schumm ..................... 429/27 |

FOREIGN PATENT DOCUMENTS

| | | |
|---|---|---|
| JP | 52-061733 | 5/1977 |
| JP | 56-132766 | 10/1981 |
| JP | 61-061364 | 3/1986 |
| JP | 01-059769 | 3/1989 |
| JP | 07-302581 | 11/1995 |
| JP | 07-326358 | 12/1995 |
| JP | 08-222194 | 8/1996 |
| JP | 09-055193 | 2/1997 |
| JP | 09-147816 | 6/1997 |
| JP | 09-161740 | 6/1997 |
| JP | 10-050318 | 2/1998 |

OTHER PUBLICATIONS

Davis, et al., "Aspects of Alkaline Cell Leakage," J. Electrochem Soc.:Electrochemical Science and Technology, Dec. 1978, pp. 1918-1923, vol. 125, No. 12.

Baugh, et al., "A Mechanism for Alkaline Cell Leakage," Journal of Applied Electrochemistry, 8 (1978), pp. 253-263.

Nientiedt, "Electrolyte Creepage in Galvanic Cells, I. Contribution to the Phenomena," Journal of Power Sources, 8 (1982), pp. 257-265.

Nientiedt, et al., "Electrolyte Creepage in Galvanic Cells, II. Transport Mechanism at High Pressures," Journal of Power Sources, 8 (1982), pp. 267-272.

* cited by examiner

ALKALINE CELL ANODE CASING

CROSS-REFERENCE TO RELATED APPLICATIONS

This application claims the benefit of U.S. Provisional Application No. 60/676,114, filed Apr. 29, 2005.

BACKGROUND

This invention relates to an electrochemical battery cell with an aqueous alkaline electrolyte and a negative electrode casing in contact with the negative electrode.

Aqueous alkaline cells are used in many batteries. In the past mercury was often used in these cells to minimize the generation of hydrogen gas due to undesired electrochemical reactions within the cells. Due to environmental concerns, efforts have been under way to reduce or eliminate the addition of mercury to alkaline cells. As a result of other changes in materials and cell designs, most large consumer alkaline batteries currently on the market contain no added mercury. However, the elimination of mercury has been more of a challenge in some types of aqueous alkaline cells, particularly button cells and metal-air cells of all sizes.

Causes of leakage in aqueous alkaline cells include hydrogen gas evolution, wicking of electrolyte through seal members and sealing interfaces and electrochemically driven creepage of electrolyte through sealing interfaces. Hydrogen gas, which can be generated by the corrosion of the negative electrode active material and other metals (including current collectors and contaminants) in contact with alkaline electrolyte, can result in increased internal cell pressure, which can drive electrolyte through weak areas in the cell housing. Electrolyte can wick by capillary action through pores and other openings in seal members and between seal members and other components that seal electrolyte within the cell housing. Capillary wicking can be accelerated by electrocapillary drive when a metal at a sealing interface is at a electrical potential (e.g., a metal component of the cell container in electrical contact with one of the electrodes), since a charged surface is more easily wetted by electrolyte. Electrochemically driven creepage can occur between a seal member and a metal housing component at a negative potential (e.g., a negative electrode casing, cover or current collector). This creepage is the result of hydroxyl ion production from the reduction of oxygen and/or the reduction of water on the negatively charged metal substrate at the leading edge of the electrolyte. The negative potential of the metal substrate, in combination with the localized high concentration of hydroxyl ions can draw water and/or electrolyte into this reaction zone, increasing the volume of liquid and forcing the liquid layer farther from the bulk electrolyte in the cell. This phenomenon is described in detail by Hull et al., in "Why Alkaline Cells Leak", J. Electrochem. Soc.: Electrochemical Science and Technology, vol. 124, no. 3 (March 1977), p. 332-339; by Davis et al. in "Aspects of Alkaline Cell Leakage", J. Electrochem. Soc.: Electrochemical Science and Technology, vol. 125, no. 12 (December 1978), p. 1919-1923; and by Baugh et al. in "A Mechanism for Alkaline Cell Leakage", Journal of Applied Electrochemistry, 8 (1978), p. 253-263.

Mercury worked well to inhibit hydrogen gassing and electrochemically driven creepage because it has a very high hydrogen evolution overpotential, and it may enhance the quality of the plating of negative electrode active material (e.g., zinc) onto the negative electrode current collector, which is important for long term suppression of gassing of the collector. Reduction and elimination of mercury from alkaline cells requires other approaches to minimizing hydrogen gassing. Examples of general approaches that have been used for alkaline $Zn/MnO_2$ cells are disclosed in the following publications, all of which are hereby incorporated by reference: U.S. Pat. No. 5,464,709 (low-gassing zinc compositions); U.S. Pat. Nos. 4,791,036 and 4,992,343 (current collector alloy composition); U.S. Pat. Nos. 5,188,869, 5,281,497, 5,397,658 and 5,445,908 (coating the current collector with low-gassing metals); U.S. Pat. No. 5,168,018 (inorganic gassing inhibitor and organic surfactant added to the negative electrode); and U.S. Pat. No. 6,468,691 (improved seal design) and U.S. Pat. No. 6,256,853 (improved cell closing process).

Because button cells and metal-air cells generally have greater potential for electrolyte leakage and/or the impact of leakage from the cells is greater than in other alkaline cells, elimination of mercury from button and metal-air cells is more of a challenge. Button cells are often sold as single cell batteries with no jackets covering the external surfaces of the cells, leaving portions of the seal interfaces, so any liquid electrolyte or electrolyte salt reaching the outside of seal interfaces is present on the external surface of the battery. Even minute amounts of electrolyte liquid or salt on the external surface of button cells is objectionable from both an aesthetic and a functional standpoint, since it can lead to corrosion of electrical contact surfaces. Metal-air cells and batteries have air access ports in their casings to allow air to enter the cells. These openings are additional places through which electrolyte can leak, and metal-air cells do not always have external jackets to conceal and contain leaking electrolyte. In button cells and some metal-air cells the negative electrode casings can function as current collectors, and the casings can have relatively large surface areas for contacting the negative electrodes relative to the electrode volumes. These large surface areas can provide more opportunity for gassing within the cells.

Clad metals, such as triclad nickel/stainless steel/copper (Ni/ss/Cu), have been popular materials for negative electrode casings for button metal-air cells. The stainless steel core layer provides strength, and the nickel plated outer layer provides an attractive appearance. The copper inner layer has excellent electrical conductivity, provides a continuous coating over the stainless steel, can be readily plated with zinc when contacted by a negative electrode containing an alkaline electrolyte and zinc as an active material, and can be formed into the desired shape without cracking to expose the stainless steel layer beneath.

Attempts have been made to further improve the leakage resistance of alkaline button and metal-air cells in which the negative electrode casing serves as the current collector. For example, Mansfield et al. (U.S. Pat. Nos. 5,279,905 and 5,306,580, which are hereby incorporated by reference) disclose an alkaline zinc-air button cell with a negative electrode casing (anode cup) made from a triclad material with a stainless steel base layer, a nickel layer on the external contact terminal surface and a copper layer on the internal negative electrode contact surface. The entire copper surface of the triclad material is coated with indium, bismuth or zinc, which have higher hydrogen generation overvoltages and lower hydrogen gassing rates than copper, but the external surface of the casing is free of indium, bismuth and zinc to maintain an acceptable appearance. However, Guo et al. (U.S. Pat. No. 6,602,629, which is hereby incorporated by reference) disclose that a coating of indium over the copper layer in the sealing interface area of the casing can offset the benefits of an indium coating in the electrode contact area, and that the seal area of the casing should have no non-in situ deposited metal with a hydrogen overvoltage higher than copper in the seal area to improve leakage resistance; the electrode contacting surface of the casing can be coated with such a metal as long the seal area is not. Ramaswami et al. (U.S. Pat. No. 6,830,847, which is hereby incorporated by reference) disclose an alkaline zinc-air cell with a multi-clad negative casing having at least the peripheral edge surface coated with a protective metal coating layer to prevent potential gradients between the dissimilar metals at the edge surface of the casing material and the resultant hydrogen gassing reactions when the edge surface is in contact with the electrolyte. The inside and/or outside surfaces of the casing may be coated with the same protective metal, which is selected from the elemental metals tin, indium, silver, copper or gold or an alloy such as brass, bronze, phosphor bronze, silicon bronze or a tin/lead alloy. Braunger et al. (U.S. Patent Pub. No. 2003/0211387 A1, which is hereby incorporated by reference) discloses an alkaline zinc-air button cell with an anode casing having a steel or stainless steel layer coated on the outside surface with nickel and on the inside surface with copper. To suppress gassing, at least the outer surface is coated with a copper-tin or copper-tin-zinc alloy containing substantially no nickel; the inner surfaces of the negative and positive casings may also be coated with the nickel-free alloy.

There is still a need for further improvement in the leakage resistance of alkaline button and metal-air cells in which the negative electrode casing serves as the current collector, especially cells with no added mercury, without adversely affecting the aesthetic appearance of the cell.

In view of the above, an object of the present invention is to provide an electrochemical battery cell with an aqueous alkaline electrolyte and having a negative casing in contact with the negative electrode with excellent leakage resistance.

Another object of the invention is to provide an alkaline cell, particularly a button or metal-air cell with no added mercury, with excellent resistance to electrolyte leakage resulting from hydrogen gassing at collector surface, electrocapillary leakage and electrochemically driven creepage, while maintaining an excellent aesthetic appearance.

SUMMARY

The above objects are met and the above disadvantages of the prior art are overcome in an electrochemical battery cell with an alkaline electrolyte and a negative electrode casing by providing the cell with a negative casing made from a metal substrate coated with a layer comprising an alloy of copper, tin and zinc on at least its entire negative electrode contact and sealing surfaces. It has been discovered that when the metal substrate is copper, copper can migrate through the alloy coating to the surface of the coating, thereby creating small localized areas of copper that will generate hydrogen gas at a higher rate than the surrounding alloy. By using a substrate material that is free of copper in at least those portions of the surface of the negative electrode casing that could come into contact with the alkaline electrolyte, this problem can be avoided.

Accordingly, one aspect of the present invention is an electrochemical battery cell with a positive electrode, a negative electrode comprising zinc, a separator disposed between the positive and negative electrode, an electrolyte comprising a solute and an aqueous alkaline solvent, and a cell housing containing the electrodes, separator and electrolyte. The housing comprises a metal positive electrode casing in contact with the positive electrode, a metal negative electrode casing in contact with the negative electrode and a seal member disposed between and electrically insulating the positive and negative casings for sealing the electrodes and electrolyte within the cell housing. The negative electrode casing is formed from a metal substrate substantially free of copper and having a first major surface, a second major surface and an edge surface around the perimeters of the major surfaces; and the negative electrode casing has a shape with an exposed surface including at least portions of the first major, second major and edge surfaces. The negative electrode casing has a seal area for sealing engagement with the seal member and a current collector area for contacting the negative electrode. At least those portions of the exposed surface of the negative electrode in the seal area and the current collector area are coated with a layer of an alloy including copper, tin and zinc and the relative amounts by weight of the copper, tin and zinc are from 55 to 85, from 9 to 30 and from 2.5 to 20, respectively. A second aspect of the invention is an electrochemical battery cell having a positive electrode with an active material including at least one of manganese dioxide, silver oxide and oxygen; a negative electrode with an active material including a zinc composition containing no added mercury; a separator disposed between the positive and negative electrode; an electrolyte including a solute and an aqueous alkaline solvent; and a cell housing containing the electrodes, separator and electrolyte. The cell housing includes a metal positive electrode casing in contact with the positive electrode, a metal negative electrode casing in contact with the negative electrode and a seal member disposed between and electrically insulating the positive and negative casings for sealing the electrodes and electrolyte within the cell housing. The negative electrode casing is formed from a metal substrate substantially free of copper and having a first major surface, a second major surface and an edge surface around the perimeters of the major surfaces; and the negative electrode casing has a shape with an exposed surface comprising at least portions of the first major, second major and edge surfaces. The negative electrode casing has a seal area for sealing engagement with the seal member and a current collector area for contacting the negative electrode. At least those portions of the exposed surface of the negative electrode casing in the seal area and the current collector area are coated with a layer of an alloy including copper, tin and zinc wherein the relative amounts by weight of the copper, tin and zinc are from 55 to 85, from 9 to 30 and from 2.5 to 20, respectively.

These and other features, advantages and objects of the present invention will be further understood and appreciated by those skilled in the art by reference to the following specification, claims and appended drawings.

Unless otherwise specified, the following definitions and methods are used herein:

substantially free of copper—copper is not intentionally added, and any copper is present only as a contaminant;

continuous coating—a coating that completely covers the surface of a substrate, with no exposed substrate or through-holes in the coating through which electrolyte can reach the surface of the substrate;

discontinuous coating—a coating that does not completely cover the surface of a substrate, with voids that leave portions of the substrate exposed and/or through-holes in the coating through which electrolyte can reach the surface of the substrate;

surface roughness—the roughness of the surface as determined using a non-contact profilometer, such as a ZYGO® NewView™ model 100 profilometer from ZYGO Corp., Middlefield, Conn., USA;

button cell—a small round cell having an overall height that is less than its diameter;

cylindrical cell—a round cell having a straight cylindrical body and an overall height that is greater than its diameter;

prismatic cell—a non-round cell having a generally prismatic cross-section (e.g., triangular, rectangular, trapezoidal, hexagonal), examples of which include flat, rectangular and square cells; and no added mercury—mercury is not intentionally added during the manufacture of the cell, including its component parts and materials, and any mercury is present only in very small quantities as a contaminant.

Unless otherwise specified herein, all disclosed characteristics and ranges are as determined at room temperature (20-25° C.).

DESCRIPTION

Figure 1:
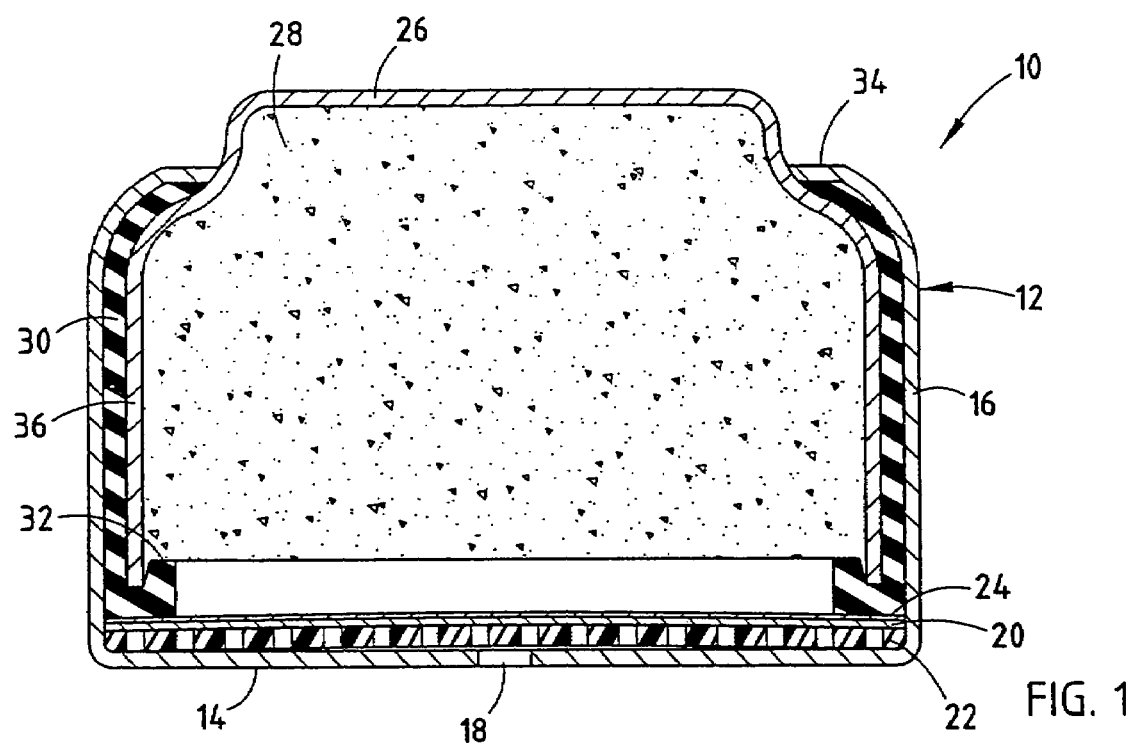
FIG. 1 is a cross sectional side view of a button cell that can employ the present invention.

Embodiments of the invention include button cells, such as zinc-air, zinc-silver oxide and zinc-manganese dioxide cells. Other embodiments include cylindrical and prismatic cells in which the negative electrode (anode) casing is in contact with the anode, thereby functioning as the anode current collector. The invention can also be used for aqueous alkaline electrolyte cells with other anode and positive electrode (cathode) active materials; the invention is especially advantageous in cells with anode materials with relatively large negative potentials, such as zinc (about −1.25 volts vs. a standard hydrogen electrode).

One embodiment of the invention is a button zinc-air cell as shown in FIG. 1. Cell 10 includes as a cathode casing a can 12 with a relatively flat central region 14 and an upstanding wall 16. Alternatively, the central region 14 of the can bottom may protrude outward from the peripheral part of the can bottom. The central region 14 of the can bottom has at least one opening 18 to act as an air entry port. The cathode can also functions as the positive contact terminal of the cell 10.

An air electrode 20 is disposed near the bottom of the cathode can 12. Air electrode 20 also preferably has a hydrophobic layer laminated to the side of the air electrode 20 facing the air entry port. Air electrode 20 can also contain a current collector embedded therein, near the side opposite the hydrophobic layer 22. A layer of separator 24 is adhered to the surface of the air electrode 20 opposite the hydrophobic layer. An additional layer of separator (not shown) can be disposed on top of the separator layer 24 adhered to the air electrode 20. An air diffusion sheet 22 can be disposed between the hydrophobic layer of the air electrode 20 and the central region 14 of the bottom of the can 12. Optionally, an additional barrier layer (not shown) can be added between the hydrophobic layer of the electrode and the air diffusion sheet 22.

Cell 10 also includes as an anode casing a cup-shaped component 26, generally referred to as the anode cup. The anode cup 26 has a concave area with a side wall 36. An anode mix 28, which includes the anode active material and aqueous alkaline electrolyte, is located between the separator 24 and the concave portion of the anode cup 26. The anode mix 28 is in direct contact with the anode cup 26 so the anode cup 26 serves as the anode current collector. The area of the anode cup 26 that can contact the anode mix is the current collector area. The anode cup 26 also functions as the negative contact terminal of the cell 10.

Cell 10 also includes an annular gasket 30, which is the seal member between the cathode can 12 and the anode cup 26. The bottom edge of the gasket 30 has an inward facing lip 32, which abuts the lower edge of the anode cup 26. Those portions of the cathode can 12 and the anode cup 26 that form a seal with the gasket 30 are referred to as the seal areas of the cathode can 12 and the anode cup 26, respectively. A sealant may be applied to the sealing surface of the gasket 30, the seal area of the cathode can 12, the seal area of the anode cup 26 or a combination thereof.

Although FIG. 1 shows the anode mix 28 disposed against the entire anode contacting surface of the anode cup 26, with a gap between the anode mix 28 and the separator 24, once the cell is assembled and closed, the cell is positioned so the anode mix 28 shifts to contact the separator 24. This leaves the anode mix 28 in contact with only a portion of the anode contacting surface of the anode cup 26 and an air space between the remainder of the anode contacting surface and the anode mix 28. The air space is intended to accommodate the increased volume of discharge reaction product and any additional water that may enter the cell or be produced in the cell during storage and discharge, as well as some gas that may be generated within the cell.

A suitable tab (not shown) can be placed over the opening (s) 18 to seal the cell until cell 10 it is ready for use.

The edge surface of the material from which the anode cup 26 shown in FIG. 1 is made is located at the open end, or bottom rim, of the side wall 36. This type of anode cup is referred to herein as a straight-walled anode cup. Other types of anode cups can have peripheral portions that extend beyond the concave area. For example, the peripheral portion can be a substantially horizontal flange, with the edge surface of the anode cup material at the outermost part of the flange. This type of anode cup is referred to herein as a hat-shaped cup. In another example, the peripheral portion of the cup can be bent outward and upward to form a U shape, with the edge surface of the anode cup material located above the bottom rim of the anode cup. This type of anode cup is referred to herein as a refold cup. The U shape of a refold cup can be an open U with a relatively large gap between the sides of the U, or it can be a closed U with little or no gap between the sides, particularly at the top of the U. Each of these types of anode cups offers different advantages. For example, in the hat-shaped and refold cups the edge surface of the cup material is a longer distance from the intended anode contacting surface of the anode cup, so electrolyte must travel a greater distance through the seal interface between the gasket and the anode cup before reaching the edge surface. Refold cups also tend to have greater resistance to radial forces, so they can provide more radial compression of the gasket in the sealed cell than a straight-walled cup. Hat-shaped and refold cups do not generally have bottom rims that are as sharp as that of a straight-walled cup, so they are less likely to damage the gasket when axial force is applied to the cup. Because a refold cup has a double layer of material, it is stronger in that area than a straight-walled or hat-shaped cup and may make the use of thinner or weaker materials possible. A straight-walled cup does not require as much of the total volume of the cell as refold and hat-shaped cups, so more internal volume is available for active materials.

A button zinc-air cell according to the invention has an anode cup made from a metal substrate that is coated with a layer of an alloy of copper, tin and zinc on at least those exposed surfaces of the formed anode cup (i.e., surfaces that are visible after the cup is formed and before it is mated with a gasket or put into a cell) that are on a current collector surface for contacting the anode and on a sealing surface for sealing engagement with the gasket, where they may come into contact with the alkaline electrolyte in the cell, either as a result of direct contact with the anode mix or as a result of migration of the electrolyte into the seal area (e.g., by capillary wicking, electrocapillary wicking or by electrochemically driven creepage between adjacent surfaces of the anode cup and gasket). The alloy can also include other metals, included to further reduce hydrogen gassing when contacted by the electrolyte, improve the quality (e.g., uniformity, continuity, thickness or smoothness) of the coating on the substrate, increase the rate of deposition of zinc from the anode onto the anode contacting surface of the cup, improve the uniformity of zinc deposition onto the anode contacting surface of the cup, provide a more desirable appearance on the external surface of the cup, improve electrical conductivity, improve resistance to damage to the coating during manufacturing and so on.

The anode cup substrate material is a metal that has suitable properties for forming the material into the desired shape and sufficient strength to maintain a compression seal between the anode cup and the gasket. Preferably the surface of the metal substrate in at least the seal area of the anode cup will be relatively smooth after the cup is formed to provide a good sealing surface that is resistant to capillary and electrocapillary wicking of the electrolyte. Examples of suitable materials include steels, such as stainless steels. Stainless steel has the additional advantage of being resistant to corrosion by the external environment of the cell in any areas where exposed on the external surface of the cell. The surface of the substrate will also be substantially free of copper at least in those areas that will be proximate the anode mix and the gasket, including the edge surface of the substrate, and preferably the entire surface of the substrate will be substantially free of copper.

In one embodiment, at least portions of the substrate surfaces to be coated with the copper-tin-zinc alloy comprise nickel. Examples include anode cups made from nickel/stainless steel/nickel triclad, nickel plated steel and nickel plated stainless steel.

In another embodiment, the surface to be coated with the copper-tin-zinc alloy comprises a material with a hydrogen overvoltage greater than that of copper (e.g., tin) so that if the copper-tin-zinc alloy coating contains or develops pores or cracks through the coating, gassing reactions will be minimized if electrolyte comes in contact with material below. Preferably the material under copper-tin-zinc alloy coating is one that will not migrate through the coating to the surface of the coating. An example of an embodiment with an undercoating is one in which another alloy comprising copper, tin and zinc is first applied to the substrate before coating with the final copper-tin-zinc alloy. An alloy with a slightly higher copper to tin ratio may plate better onto the substrate, but the coating may have a more yellow or red appearance than desired, while an alloy with a lower copper to tin ratio may have a desirable white appearance but not plate satisfactorily. First plating an alloy with a higher copper to tin ratio (e.g., about 4:1) onto the substrate (e.g., stainless steel), followed by an alloy with a lower copper to tin ratio (e.g., about 2:1), can provide better coverage of the surface of the substrate as well as the desired whiter appearance.

The copper-tin-zinc alloy layer includes copper, tin and zinc in proportions ranging from about 55 to 85 parts copper, about 10 to 30 parts tin and about 2.5 to 20 parts zinc by weight (not including small quantities of contaminants or other alloying metals, as described below). The higher zinc levels are desirable to minimize gassing, so the preferred proportions of copper, tin and zinc in the alloy are about 55 to 60 parts copper, about 25 to 30 parts tin and about 5 to 20 parts zinc. More preferably the proportions are about 55 to 60 parts copper, about 25 to 30 parts tin and about 10 to 20 parts zinc. Most preferably the alloy contains at least about 15 weight percent zinc; achieving much more than 16 weight percent zinc is difficult. The alloy layer may also include small quantities (e.g., less than about 2 percent by weight) of other metals to modify the properties (e.g., hydrogen gassing rate, adhesion to the substrate, thickness or uniformity) of the alloy layer. Preferably the alloy layer includes little (no more than about 2 percent) or essentially no (less than 10 parts per million by weight) lead. The exact composition of the alloy layer can vary, depending on such factors as the method of applying the coating, the composition of the plating bath or solution, contaminants in the materials and equipment used and process control parameters. Preferably the coating will be continuous and free of cracks or pinholes through the coating on at least those portions of the substrate that will be proximate the anode mix and gasket, so electrolyte will not be able to directly contact the substrate after the cell is assembled. A preferred coating thickness is about 1 to 8 μm, more preferably at least about 3 μm. Preferably the coating thickness is no more than 5 μm. If the coating is too thin it may not provide a continuous coating, and if it is too thick it may adversely affect the total material thickness, tend to build up at corners and edges of the formed parts and unnecessarily increase the time required to apply the coating.

The copper-tin-zinc alloy may be applied to the substrate at any suitable time using any suitable process. For example, the coating may be applied to pieces of the substrate before they are formed into the desired cup shape or to the formed cups. The alloy may be applied to just portions or to the entire external surface of the cup. Because the alloy is relatively hard compared to metals such as copper, a continuous coating may be advantageously achieved and maintained on the cup with a minimum amount of the alloy when the alloy is applied after the cup is formed.

The copper-tin-zinc alloy can be applied directly to the substrate, or at least a portion of the substrate may be coated with another metal, such as nickel or tin, before the layer of copper-tin-zinc alloy is applied to the anode cup. This other metal may be used to provide a desirable appearance, improve the corrosion resistance, facilitate deposition of the copper-tin-zinc alloy layer, or reduce the electrical contact resistance of the contact terminal surface of the anode cup if not subsequently coated with the copper-tin-zinc alloy. This intermediate metal coating can include one or more metals or alloys and can be applied as an activation strike layer, for example.

In one embodiment the strike layer can comprise nickel and can be electrodeposited using a strike solution of Woods nickel, for example. While the substrate material itself is substantially free of copper, in another embodiment a copper or copper-containing strike can be used to deposit a thin layer of copper or copper alloy onto the substrate prior to depositing the final copper-tin-zinc alloy layer. The thickness of the copper-containing strike layer is preferably no greater than about 2.5 μm and more preferably no greater than about 1.0 μm. If the strike layer is too thick, there may be sufficient copper present in the strike layer to diffuse through the subsequent copper-tin-zinc alloy layer to the surface of the anode cup. The copper-containing strike layer is preferably at least 0.5 μm thick. If it is too thin, it may be inadequate to provide the desired properties. The copper-containing strike layer may be electrodeposited using a strike solution of cyanide copper or cyanide bronze, for example.

A preferred process for applying the coating is electroplating, particularly barrel, vibratory, and spouted bed electrode (a means of electroplating developed by Technic Inc., Cranston, R.I., USA, whereby the parts to be plated circulate in a continuous fountain-like flow of electrolyte from the plating bath) plating of the formed anode cups. Electroplating processes can provide a smooth, continuous coating on at least the surfaces proximate the anode mix and gasket (including the edge surface of the substrate), as well as an attractive, electrically conductive, corrosion resistant coating on the contact terminal portion of the anode cup. A preferred method of electroplating small anode casings, particularly those with a maximum diameter or width of about 12 mm and a maximum height of about 5 mm, is spouted bed electrode plating. Such a process is disclosed in U.S. Pat. No. 6,193,858, which is hereby incorporated by reference.

A suitable alloy plating solution can contain about 2 to 12.5 g/liter of copper, about 6 to 34 g/liter of tin and about 0.75 to 1.6 g/liter of zinc. A preferred plating solution is MIRALLOY® 2844 plating bath from Electronic Chemicals, OMG Galvanotechnik GmbH, Schwäbisch Gmünd, Germany, containing about 8.5, 34.0 and 0.75 g/liter of Cu, Sn and Zn, respectively. Plating control parameters, such as time, temperature, pH, bath circulation and current density, can vary depending upon the specific process and equipment as well as the type, size, quantity and shape of the anode casings.

Examples of button alkaline zinc-air cells like the cell shown in FIG. 1 are PR41, PR44, PR48, PR63 and PR70 types, according to International Electrotechnical Commission (IEC) International Standard 60086-1. Such cells have an alkali metal hydroxide electrolyte, such as an aqueous solution of KOH, an anode containing zinc as an active material and a positive electrode capable of reducing oxygen contained in air that enters the cell through one or more air entry ports.

In a preferred embodiment of a button alkaline zinc-air cell, the cathode can is made from nickel plated steel and the gasket is made from a suitable elastomeric material such as nylon 6-6.

A sealant material can be applied to any of the sealing surfaces of the anode cup, cathode can and gasket. For example, the entire gasket may be coated with one or more sealant materials such as asphalt (bitumen), elastomeric materials (e.g., ethylene vinyl acetate and aliphatic or fatty polyamides) and thermoplastic elastomers (e.g., polyolefins, polyamine, polyethylene, polypropylene and polyisotutene). A preferred sealant is Swift 82966 from Forbo Adhesives, Jackson, Tenn., USA, and can be applied to the gaskets as in a solution with a volatile solvent such as trichloroethylene or isopropyl alcohol.

The anode mix preferably contains a low-gassing zinc composition, preferably with no added mercury, and additives that can enhance the desired plating of zinc onto the anode contacting surface of the anode cup and inhibit hydrogen gassing after the cell has been closed.

Low-gassing zinc compositions suitable for use in alkaline cells with no added mercury are disclosed in U.S. Pat. No. 6,602,629 (Guo et al.), U.S. Pat. No. 5,464,709 (Getz et al.) and U.S. Pat. No. 5,312,476 (Uemura et al.), which are hereby incorporated by reference. An example of a suitable zinc alloy composition is an alloy containing bismuth, indium and aluminum, such as a zinc alloy containing about 100 parts per million by weight (ppm) of bismuth, 200 ppm of indium, 100 ppm by weight of aluminum and a low level (no more than 35 ppm) of lead and having an average particle size ($D_{50}$) between about 90 and 120 micrometers. Examples of such zinc alloys are grades BIA, NGBIA 100 (having a $D_{50}$ of about 100 μm) and NGBIA 115 (having a $D_{50}$ of about 115 μm) from N.V. Umicore, S.A., Brussels, Belgium. Another example of a low-gassing zinc composition is ZCA grade 1230 zinc powder from Zinc Corporation of America, Monaca, Pa., USA, which is a zinc alloy containing about 400-550 ppm of lead; no more than 1.5 weight percent of zinc oxide; no more than a total of 25 ppm of chromium, iron, molybdenum, arsenic, antimony and vanadium; and no more than 68 ppm of chromium, iron, molybdenum, arsenic, antimony, vanadium, cadmium, copper, nickel, tin, and aluminum.

Examples of corrosion (hydrogen gassing) inhibitors and other desirable additives that can be used in alkaline zinc cells include indium compounds (e.g., indium hydroxide), zinc oxide and corrosion inhibiting surfactants (e.g., LUBRHOPHOS LB-400, a polyoxyethylene octadecenyl ether phosphate from Rhodia, Inc., Cranbury, N.J., USA; CARBOWAX® 550, a polyethylene glycol available from Dow Chemical Company, Midland, Mich., USA; DISPERBYK® 102, 190 and 155 from BYK Chemie, Germany; STEPFAC® 8170 and 8173, from Stepan Chemicals, Northfield, Ill., USA; QS-44®, from Dow Chemical Company, Midland, Mich., USA).

The anode mix may also contain a gelling agent. Examples of gelling agents include CARBOPOL® 940 and 934, acrylic acid polymers from Noveon, Inc., Cleveland, Ohio, USA) and SANFRESH™ DK500MPS, a sodium salt of an acrylic acid polymer from Sanyo Chemical Industries Ltd., Kyoto, Japan.

The electrolyte solution can contain one or more of KOH, NaOH and LiOH. NaOH and LiOH tend to produce less hydrogen gas, and KOH tends to result in better cell discharge performance, especially on high current and high power discharge and to high voltage endpoints.

The air electrode includes a catalytic material, such as manganese oxide ($MnO_x$), and may also include a conductive material, such as activated carbon, and a binder, such as tetrafluoroethylene in an aqueous solution containing a surfactant. The current collector can be made from an open conductive metal structure, such as a screen or expanded metal made from nickel. The separator layer adhered to the air electrode can be a microporous polypropylene treated to be hydrophilic, such as CELGARD® 3501 or CELGARD® 5550 from Celgard LLC, Charlotte, N.C., USA; additional separator layers can be made from the same material or a different material. The hydrophobic layer and the optional barrier layer can be made from a sheet of polytetrafluoroethylene (PTFE) film. The air diffusion sheet can be a porous material such as grade S3703 kraft paper from Kimberly-Clark Corp., Dallas, Tex., USA.

The gasket can be made from an elastomeric material such as nylon or polypropylene, that can form and maintain a good compression seal against the sealing surfaces of the anode cup, the cathode can and the periphery of the separator and air electrode when force is applied during cell closing. The gasket material will be stable in contact with the electrolyte, without allowing electrolyte to pass therethrough. Preferably the gasket material will also have low rates of oxygen and water vapor permeability, yet allow some hydrogen gas generated within the cell to permeate to the external environment. The gasket can be coated with a sealant, such as asphalt, either alone or with elastomeric materials or ethylene vinyl acetate, aliphatic or fatty polyamides, and thermoplastic elastomers such as polyolefins, polyamine, polyethylene, polypropylene and polyisobutene.

Any suitable process can be used to assemble and close the cell. For example, the air distribution sheet, barrier layer, air electrode and separator can be inserted into the bottom of the cathode can, while the gasket is placed over the anode cup (inverted relative to the position shown in FIG. 1) and the anode mix is placed into the concave part of the cup. The cathode can may then be inverted and pressed against the anode cup/gasket assembly, with the side walls of the gasket and anode cup within the side wall of the cathode can. The edge of the cathode can may be deformed inward, so the rim of the cathode can pushes both radially inward and axially on the gasket and anode cup to seal the cell. Any suitable method may be used to deform the edge of the can inward to seal the cell, including crimping, colleting, swaging, redrawing, and combinations thereof. Preferably the cell is sealed by crimping or colleting with a segmented die, as disclosed in U.S. Pat. No. 6,256,853. After assembly the cell can be turned into the orientation shown in FIG. 1, allowing the anode mix to shift downward against the separator before the anode mix gels.

Another embodiment of an alkaline button cell according to the invention is a zinc-silver oxide cell. This cell type of has an anode cup and gasket similar to those described above. Because the cathode material is completely contained within the cell, the cathode can has no air access ports. The anode can be a gelled anode similar to the zinc-air cell anode described above. The cathode can be a disk-shaped pellet molded from a mixture containing active material, an electrically conductive material and a binder. The active material includes at least a silver oxide (AgO, $Ag_2O$ or a mixture thereof) and may also include another active material, such as manganese dioxide. The cathode pellet can be disposed directly against and extending across the bottom inside surface of the cathode can so that the periphery is compressed between the gasket base and the inside surface of the can (similar to the zinc-air cell shown in FIG. 1). Because silver oxide is slightly soluble in alkaline electrolyte, at least one layer of the separator must be impermeable to silver ions.

In a preferred button zinc-silver oxide cell the specific materials and their relative amounts can vary depending on the end use requirements. The active material is $Ag_2O$ or a blend of $Ag_2O$ and $MnO_2$, the electrically conductive material in the positive electrode is graphite, the electrolyte contains KOH (generally for devices requiring relatively high discharge rates) or both KOH and NaOH, and the separator is a laminated material with layers of cellophane and polyethylene.

Another embodiment of the invention is a prismatic alkaline zinc-air cell. In general, the same types of materials that are suitable for button zinc-air cells are also suitable for prismatic zinc-air cells. An example of a prismatic zinc-air cell is disclosed by Shrim et al. in U.S. Pat. No. 6,265,102, which is hereby incorporated by reference. As in the button cells described above, the anode casing is in direct contact with the anode mix and functions as both the anode current collector and the external negative terminal contact. For some types of prismatic cells, nickel plated cold rolled steel is a preferred anode casing substrate.

The following examples illustrate the embodiments of the invention and its advantages.

EXAMPLE 1

Anode cups for PR48 type alkaline zinc-air button cells were made from nickel/stainless steel/copper (Ni/ss/Cu) tri-clad strip. The cups were straight-walled cups, like the cup shown in FIG. 1, with the nickel layer on the convex surface and the copper layer on the concave surface. Some of the cups were then coated with a Cu—Sn—Zn alloy. The coating was applied to the entire surfaces of the cups using a barrel plating process, with a plating solution containing copper, tin and zinc, as well as a lead salt, used as a leveling agent.

Samples of plated and unplated cups were tested for surface roughness ($R_a$) in several locations using a ZYGO® NEWVIEW 100™ non-contact profilometer. The average surface roughness $R_a$ values (in μm) are shown in Table 1. In general, the surface roughness tended to be slightly greater on the outside (convex) surfaces of the cups, but the surface roughness on the inside surfaces did not appear to be affected.

TABLE 1

| Location | Average Surface Roughness $R_a$ (μm) | |
|---|---|---|
| | Uncoated Cups | Coated Cups |
| Horizontal surface - outside | 0.34 | 0.48 |
| Horizontal surface - inside | 0.11 | 0.10 |
| Vertical wall - outside | 0.51 | 0.57 |
| Vertical wall - inside | 0.89 | 0.88 |

Visual examination of the plated cups did not reveal imperfections or breaks in the alloy coating. Analysis of the plated cups by Scanning Electron Microscopy and Energy Dispersive Spectroscopy (SEM/EDS) showed the composition of the coating to be essentially 56 wt % Cu, 31 wt % Sn, 10 wt % Zn and 3 wt % Pb. The Pb content was attributed to the use of a lead salt as a leveling agent in the plating process. The average thickness of the coating was found to be about 4.2 μm on the inside and 4.7 μm on the outside surfaces of the cups.

Samples of uncoated and coated cups were tested for relative gassing rate and duration in contact with an alkaline zinc anode. The sample cups were oriented with the open ends facing up, and a small amount of dry anode mix (99.7 wt % grade 1230 zinc powder from ZCA, 0.25 weight percent CARBOPOL® EX-65 cross-linked polyacrylic acid polymer binder from Noveon Inc., and 450 ppm $In(OH)_3$), followed by a few drops of electrolyte solution (33 wt % KOH in water), was placed into each cup. The cups were observed for the formation of gas bubbles at the interface between the anode material and the side wall of the anode cup. With the uncoated anode cups, many small bubbles formed, and bubbles continued to form for an average of about 730 seconds. With the coated cups, no bubbles were observed.

Samples of uncoated and coated cups were tested on a quantitative gassing test to determine the quantity of gas produced over time. The anode material used was the same as that used for the relative gassing rate and duration test above. For each type of anode cup, two cups were prepared and tested together. Each cup was prepared by inserting it into a gasket as it would be in assembling a cell and then coating the remaining exposed surface of the cup an a portion of the gasket with epoxy. For each test, anode material containing 10 grams of dry anode mix (99.7 wt % grade 1230 zinc powder, 0.25 weight percent CARBOPOL® EX-65 binder and 450 ppm $In(OH)_3$) and 5 ml of electrolyte solution (33 wt % KOH, 3 wt % ZnO and 360 ppm CARBOWAX® 550 surfactant in water) was placed in a glass vessel, the two anode cups were immersed in the anode material, and the vessel was filled with light mineral oil. The vessel was closed with a stopper with a protruding graduated glass tube so there was no air trapped in the vessel and the level of the mineral oil reached part way up the glass tube. The vessel was immersed to a level above the anode material in a water bath maintained at 45° C. The level of the top of the oil in the graduated tube was recorded at the start of the test and after 72 hours at 45° C.

During the first 72 hours the average gassing rate with the uncoated cups was 145 μl/cup/day at 45° C., and the average with the coated cups was about 6 μl/cup/day. In similar testing the average gassing rate for the anode material alone (not in contact with an anode cup) was determined to be about 1.0 μl/g/day during the first 72 hours. It was also observed that during the next 96 hours at 45° C., gassing continued at about the same rate with the uncoated cups, while little additional gassing occurred with the coated cups.

EXAMPLE 2

PR48 type alkaline zinc-air button cells were made according to FIG. 1 and the above description thereof, using uncoated and Cu—Sn—Zn coated anode cups from Example 1. The anode composition in each cell contained 0.327 g of dry anode mix (99.7 wt % grade 1230 zinc powder, 0.25 wt % CARBOPOL® EX-65 binder and 450 ppm $In(OH)_3$) and 0.087 g of electrolyte solution (33 wt % KOH, 3.0 wt % ZnO and 360 ppm CARBOWAX® 550 surfactant). After the cells were assembled, the air holes were sealed by placing adhesive tape over the bottoms of the cathode cans.

After aging for 4 weeks, sample cells with each type of anode cup were put on a variety of tests. Some were tested for open circuit voltage (OCV), closed circuit voltage at 70 milliseconds on a 100 ohm load (CCV) and AC impedance at 40 Hz (impedance). Some were tested for capacity on 750 ohms continuous to 0.9 volt [JDG], 375 ohms continuous to 0.9 volt or on a high power hearing aid test (16 hours per day with a 3 mA background current and a 0.1 second, 12 mA pulse once per hour to 1.1 volts). Other samples were stored at 71° C. Of the cells at 71° C., some were removed and tested for limiting current at 4 or 8 weeks, and some were removed and inspected periodically for leakage at the air holes. The remainder were inspected were inspected periodically for bubbles in the sealing tape and salting (salt visible at the can-gasket and the cup-gasket interface under 3 power magnification).

There were no differences in initial OCV and CCV between cells with uncoated and coated anode cups; the initial impedance of cells with coated cups was slightly lower than that of cells with uncoated cups. There was no statistical difference on the 750 ohm or 375 ohm discharge test. Cells with coated cups averaged 7 percent more capacity to 1.1 volts, 2 percent more to 1.0 volt and 7 percent lower to 0.9 volt on the hearing aid test. There was no statistical difference in limiting current after 4 weeks or 8 weeks at 71° C., and there was no leakage at the air holes. Bubbles in the tape and total salting after storage at 71° C. were substantially lower in cells with coated cups. Of those with uncoated cups, 36 percent had bubbles in the tape after 1 week at 71° C., increasing to 50 percent after 8 weeks at 71° C., while only 6 percent of the cells with coated cups had bubbles in the tape, all occurring within 1 week. By 8 weeks at 71° C., 18 percent of the cells with uncoated cups had salting at the anode cup and none at the can, while none of the cells with coated cups had salting at the anode cup and 2 percent had salting at the can.

EXAMPLE 3

Uncoated and coated PR48 anode cups like those in Example 1 were made. The composition of the coating was about 55-60 wt % Cu, 20-25 wt % Sn, 15-20 wt % Zn. About 2 wt % Pb was also found on the surface of the coating, attributed to the use of lead as a leveling agent during plating and subsequent inadequate rinsing of the plated cups. PR48 cells were made with both uncoated and coated cups, using various anode compositions, as summarized in Table 2. The anode compositions contained 78 wt % unamalgamated zinc powder (ZCA grade 1230), 22 wt % electrolyte containing 33 wt % KOH and ZnO, 0.25 wt % (based on the weight of zinc powder) gelling agent (SANFRESH™ DK-300 or CARBOPOL® 934), and in some lots 100 parts per million (ppm, based on the weight of zinc powder) of a gas-inhibiting surfactant (CARBOWAX® 550) was also included. After the cells were made, the air holes were sealed with adhesive tape.

The cells were examined for bubbles in the adhesive tape at 1 and 7 days. The results are summarized in Table 2. A statistical analysis showed that the cup coating was the dominant effect, but the average number of bubbles was less with 3% than with 1% ZnO and less with no surfactant than with surfactant.

TABLE 2

| Lot No. | Anode Cup | ZnO (wt %) | Sur- factant | Gelling Agent | Bubbles (per 10,000 cells) | |
|---|---|---|---|---|---|---|
| | | | | | 1 Day | 7 Days |
| 1 | uncoated | 3 | yes | DK-300 | 119 | 494 |
| 2 | coated | 3 | yes | DK-300 | 0 | 0 |
| 3 | uncoated | 3 | no | DK-300 | 127 | 1892 |
| 4 | coated | 3 | no | DK-300 | 32 | 44 |
| 5 | uncoated | 1 | yes | DK-300 | 159 | 3417 |
| 6 | coated | 1 | yes | DK-300 | 51 | 106 |
| 7 | uncoated | 1 | no | DK-300 | 693 | 742 |
| 8 | coated | 1 | no | DK-300 | 30 | 89 |
| 9 | uncoated | 3 | yes | 934 | 2209 | 5741 |
| 10 | coated | 3 | yes | 934 | 0 | 123 |

After 7 days the tape was removed and new tape applied to all cells in lots 1 through 8 to reseal the air holes. Cells from each of these lots were stored under each of three conditions: room temperature, 60° C./50% relative humidity and 71° C. Cells were examined periodically for bubbles in the tape and salting. These results are summarized in Table 3 for lots with uncoated and coated anode cups and show that in general less gassing and salting occurs in cells with plated anode cups for storage times less than 6 months (both at room temperature and high temperatures. However, after 6 months at 60° C./5% RH and 6 months at room temperature, the number of cells with bubbles in the tape were higher for cells with coated cups than cells with uncoated cups. (Note: the results in Table 3 are cumulative; in some instances the rate of bubbles in the tape and salting decrease with increasing time on test because random samples were taken from each lot at particular times for other testing.)

TABLE 3

| Storage Condition | Time | Bubbles (per 10,000 cells) | | Salting (per 1000 cells, visible at 3×) | | | |
|---|---|---|---|---|---|---|---|
| | | | | Cup/Gasket | | Can/Gasket | |
| | | Uncoated Cups | Coated Cups | Uncoated Cups | Coated Cups | Uncoated Cups | Coated Cups |
| 60° C./50% RH | 4 weeks | 214 | 0 | 7.1 | 0 | 0 | 3.6 |
| 60° C./50% RH | 3 months | 334 | 42 | 8.3 | 0 | 8.3 | 4.2 |
| 60° C./50% RH | 6 months | 2700 | 2900 | | | | |
| 71° C. | 1 week | 750 | 458 | | | | |
| 71° C. | 2 weeks | 1080 | 625 | 0 | 16.7 | 8.3 | 70.8 |
| 71° C. | 4 weeks | 1170 | 875 | 12.5 | 8.3 | 33.3 | 208.3 |
| 71° C. | 6 weeks | 1150 | 800 | 20.0 | 0 | 35.0 | 200.0 |
| 71° C. | 8 weeks | 1500 | 900 | 25.0 | 0 | 25.0 | 210.0 |
| Room Temp. | 6 months | 46 | 95 | | | | |

Some of the cells with bubbles in the tape after storage for 6 months at 60° C./50% RH were examined. The anode contact surfaces of the uncoated cups had a uniform color, while the anode contact surfaces of the coated cups had some lighter areas and some dark spots. Analysis of one of the uncoated cups showed about 13.8 wt % copper, 71.3 wt % zinc, 12.5 wt % indium and 2.5 wt % oxygen on the anode contact surface. A significant amount of indium was found because of the presence of $In(OH)_3$ in the anode material. The majority of the anode contact surface of the coated cup contained about 13.0 wt % copper, 79.0 wt % zinc, 2.2 wt % tin and 5.9 wt % oxygen; the light area contained less tin (0.3 wt %); the dark spots contained more copper (18.0 wt %). It was believed that higher copper content of the dark spots was due to migration of copper from the copper layer of the substrate to the surface of the coating, creating areas of higher gassing at the dark spots. The presence of lead on the surface of the coating may also have contributed to gassing in the cells with coated anode cups.

Some cells were also removed from storage, opened and analyzed to determine the amount of zinc that had plated onto the inside surface of the anode cups during storage; the average amounts of zinc plating are shown in Table 4. In general it appears that the rate of plating of zinc from the anode onto the surface of the anode cup is greater in cells with coated cups. As the surface of the cup is plated with zinc, less of the surface is available for gas generating reactions to occur.

TABLE 4

| Storage Condition | Time | Zinc Plated on Cups (mg/cup) | |
|---|---|---|---|
| | | Uncoated Cups | Coated Cups |
| 21° C. | 4 months | 0.7 | 0.7 |
| 71° C. | 4 weeks | 2.0 | 7.3 |
| 71° C. | 9 weeks | 3.5 | 12.2 |

Discharge testing was done on cells from each of lots 1-8. Prior to the discharge tests, the cells were tested for limiting current. The results are summarized in Table 5. The average capacity values shown are relative values, indexed to the average capacity with uncoated cups for each of the discharge tests (i.e., 100×(average capacity)/(average fresh capacity with uncoated cup).

TABLE 5

| Discharge Test | Age/ Storage Temp. | Ave. Limiting Current (mA) | | Ave. Discharge Capacity | |
|---|---|---|---|---|---|
| | | Uncoated Cup | Coated Cup | Uncoated Cup | Coated Cup |
| Hearing Aid to 0.90 V | Fresh | 7.2 | 6.4 | 100 | 107 |
| 1000 Ω 16 hrs./day to 0.90 V | Fresh | 8.0 | 7.3 | 100 | 100 |
| 1000 Ω 16 hrs./day to 0.90 V | 9 mos./room temp. | 7.5 | 7.4 | 93 | 94 |
| 1000 Ω 16 hrs./day to 0.90 V | 16 mos./room temp. | 4.1 | 3.4 | 93 | 96 |
| 1000 Ω 16 hrs./day to 0.90 V | 20 days/60° C. | 6.2 | 7.5 | 100 | 99 |
| 1000 Ω 16 hrs./day to 0.90 V | 60 days/60° C. | 4.6 | 5.3 | 97 | 94 |

For fresh cells, those with coated cups had a higher limiting current that those with uncoated cups; however, there was not a statistically significant difference after storage at room temperature or at 60° C. Even though the limiting current of fresh cells was higher with uncoated cups, the capacity was comparable on both discharge tests. There was also no statistically significant difference in capacity after storage until 60 days at 60° C., when the cells with coated anode cups had lower capacity on the 1000 ohm test. This is consistent with the higher rate of bubbles in the tape for cells with coated anode cups after storage for 6 months at 60° C./50% RH, believed due to migration of copper through the coating.

EXAMPLE 4

Anode cups for PR41 type cells were made using a variety of substrate materials, as shown in Table 6. Lots 3 through 9 were then coated with a Cu—Sn—Zn alloy by electroplating in a bench-top unit using a MIRALLOY® 2844 plating bath solution (8.5 g/liter Cu, 34.0 g/liter Zn, 50.0 g/liter KCN and 30.0 g/liter KOH) with two brighteners (BR 1-1 and BR 2 from Umicore Galvanotechnik GmbH added. The anode cups were continuously stirred during plating to avoid nesting of the cups and achieve uniform plating. In lots 3, 4 and 6 the cups were treated before plating with the Cu—Sn—Zn alloy to better prepare the surface of the cups for plating. The cups in lots 3 and 6 had a thin (about 2 µm) coating applied using a sulfuric acid (pH less than 7) bright tin bath. The cups in lot 4 had a thin (less than 2.5 µm) layer of nickel applied using a Wood's nickel bath (a nickel chloride/hydrochloric acid bath designed for plating an initial layer of nickel on a stainless steel surface), followed by a thin (about 5 µm electroplated layer of copper applied before plating with the Cu—Sn—Zn alloy. The purpose of these two layers of plating was to enable strongly adherent uniform plating of tin.

PR41 alkaline zinc-air button cells were made using uncoated and coated cups; coated cups were first examined and cups with incomplete coating layers and/or defects such as cracks and pinholes in the coating visible with 20 power magnification were not used. The anode material used contained 77.8 wt % dry anode mix, consisting of 99.71 wt % unamalgamated zinc powder, 0.25 w % DK300 gelling agent and 0.04 wt % In(OH)$_3$; and 22.2 wt % aqueous solution, consisting of 33 wt % KOH, 1.0 wt % ZnO and 0.035 wt % surfactant (CARBOWAX® 550). Two different types of zinc powder were used—ZCA grade 1230 and BIA 115). Table 6 lists the base material of the anode cups, the plating solution(s) used to coat the cups, the type of rinsing solution(s) used to rinse the cups after coating and the type of zinc powder used in the anode for each lot of cells made.

After the cells were made, the air holes in the cathode cans were sealed with an adhesive tape. The cells were observed for bubbles in the tape after aging for 7 days; the number of bubbles (per 10,000 cells) is also summarized in Table 6. These results show that inadequately rinsing the cups after coating can cause gassing in cells.

TABLE 6

| Lot No. | Anode Cup Material | Anode Cup Coating | Rinse Solution(s) | Zinc Type | Bubbles (per 10,000 cells) |
|---|---|---|---|---|---|
| 1 | Ni/ss/Cu Triclad | none | — | ZCA 1230 | 0 |
| 2 | Ni/ss/Cu Triclad | none | — | BIA 115 | 0 |
| 3 | 304 Stainless Steel | acid Sn, Cu—Sn—Zn | H$_2$SO$_4$, aq. KOH, deion. H$_2$O | BIA 115 | 77 |
| 4 | 304 Stainless Steel | Woods Ni, Cu, Cu—Sn—Zn | H$_2$SO$_4$, aq. KOH, deion. H$_2$O | BIA 115 | 60 |
| 5 | 304 Stainless Steel | Cu—Sn—Zn | H$_2$SO$_4$, aq. KOH, deion. H$_2$O | BIA 115 | 20 |
| 6 | Ni/ss/Ni Triclad | acid Sn, Cu—Sn—Zn | H$_2$SO$_4$, aq. KOH, deion. H$_2$O | BIA 115 | 0 |
| 7 | Ni/ss/Ni Triclad | Cu—Sn—Zn | H$_2$SO$_4$, aq. KOH, deion. H$_2$O | BIA 115 | 0 |
| 8 | Ni/ss/Cu Triclad | Cu—Sn—Zn | H$_2$SO$_4$, aq. KOH, deion. H$_2$O | BIA 115 | 0 |
| 9 | Ni/ss/Cu Triclad | Cu—Sn—Zn | deionized H$_2$O | BIA 115 | 0 |
| 10 | Ni/ss/Cu Triclad | none | — | BIA 115 | 0 |
| 11 | Ni/ss/Cu Triclad | none | — | ZCA 1230 | 0 |

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

The invention claimed is:

1. An electrochemical battery cell comprising a positive electrode; a negative electrode comprising zinc; a separator disposed between the positive and negative electrode; an electrolyte comprising a solute and an aqueous alkaline solvent; and a cell housing containing the electrodes, separator and electrolyte; the housing comprising a metal positive electrode casing in contact with the positive electrode, a metal negative electrode casing in contact with the negative electrode and a seal member disposed between and electrically insulating the positive and negative casings for sealing the electrodes and electrolyte within the cell housing; wherein:

the negative electrode casing is formed from a metal substrate substantially free of copper and having a first major surface, a second major surface and an edge surface around the perimeters of the major surfaces;

the negative electrode casing has a shape with an exposed surface comprising at least portions of the first major, second major and edge surfaces;

the negative electrode casing has a seal area for sealing engagement with the seal member and a current collector area for contacting the negative electrode;

at least those portions of the exposed surface of the negative electrode casing in the seal area and the current collector area are coated with a first layer of an alloy comprising copper, tin and zinc and the relative amounts by weight of the copper, tin and zinc are from 55 to 85, from 9 to 30 and from 2.5 to 20, respectively;

at least those portions of the exposed surface of the negative electrode casing in the seal area and the current collector area are coated with a second layer of an alloy comprising copper, tin and zinc over the first layer of an alloy comprising copper, tin and zinc; and a ratio of copper to tin in the second layer that is lower than a ratio of copper to tin in the first layer.

2. The cell as defined in claim 1, wherein the entire exposed surface of the negative electrode casing is coated with the first layer of an alloy comprising copper, tin and zinc.

3. The cell as defined in claim 1, wherein the first layer of an alloy comprising copper, tin and zinc is disposed directly on the substrate.

4. The cell as defined in claim 1, wherein a strike layer comprising at least one metal or metal alloy and having a thickness no greater than 1 micrometer is disposed between the substrate and the first layer of the alloy.

5. The cell as defined in claim 4, wherein the strike layer comprises nickel.

6. The cell as defined in claim 4, wherein the strike layer is at least 0.5 micrometers thick.

7. The cell as defined in claim 1, wherein the first layer of the alloy comprising copper, tin and zinc has a thickness of 1 to 8 micrometers.

8. The cell as defined in claim 7, wherein the first layer of the alloy comprising copper, tin and zinc is at least 3 micrometers thick.

9. The cell as defined in claim 7, wherein the first layer of the alloy comprising copper, tin and zinc is no more than 5 micrometers thick.

10. The cell as defined in claim 1, wherein the copper, tin and zinc alloy contains no more than 2 weight percent of lead.

11. The cell as defined in claim 10, wherein the alloy contains no more than 2 weight percent of metals other than copper, tin and zinc.

12. The cell as defined in claim 1, wherein the relative weights of the copper, tin and zinc are from 55 to 60, from 25 to 30 and from 10 to 20, respectively.

13. The cell as defined in claim 1, wherein the negative electrode casing substrate comprises a steel.

14. The cell as defined in claim 13, wherein the steel comprises a stainless steel.

15. The cell as defined in claim 1, wherein the cell is a button cell.

16. The cell as defined in claim 1, wherein the cell is a prismatic cell.

17. An electrochemical battery cell comprising:
a positive electrode with an active material comprising at least one member selected from the group consisting of manganese dioxide, silver oxide and oxygen;
a negative electrode with an active material comprising a zinc composition containing no added mercury;
a separator disposed between the positive and negative electrode;
an electrolyte comprising a solute and an aqueous alkaline solvent; and
a cell housing containing the electrodes, separator and electrolyte and comprising a metal positive electrode casing in contact with the positive electrode, a metal negative electrode casing in contact with the negative electrode and a seal member disposed between and electrically insulating the positive and negative casings for sealing the electrodes and electrolyte within the cell housing; wherein:
the negative electrode casing is formed from a metal substrate substantially free of copper and having a first major surface, a second major surface and an edge surface around the perimeters of the major surfaces;
the negative electrode casing has a shape with an exposed surface comprising at least portions of the first major, second major and edge surfaces;
the negative electrode casing has a seal area for sealing engagement with the seal member and a current collector area for contacting the negative electrode;
at least those portions of the exposed surface of the negative electrode casing in the seal area and the current collector area are coated with a first layer of an alloy comprising copper, tin and zinc and the relative amounts by weight of the copper, tin and zinc are from 55 to 85, from 9 to 30 and from 2.5 to 20, respectively;
at least those portions of the exposed surface of the negative electrode casing in the seal area and the current collector area are coated with a second layer of an alloy comprising copper, tin and zinc over the first layer of an alloy comprising copper, tin and zinc; and
a ratio of copper to tin in the second layer that is lower than a ratio of copper to tin in the first layer.

18. The cell as defined in claim 17, wherein the negative electrode casing has a cupped shape with a concave area and a side wall.

19. The cell as defined in claim 18, wherein the anode casing comprises no peripheral area extending outward beyond the concave area.

20. The cell as defined in claim 18, wherein the anode casing comprises a peripheral portion extending outward beyond the concave area.

21. The cell as defined in claim 20, wherein the peripheral area comprises a flange and the edge surface of the anode casing is at the outermost part of the flange.

22. The cell as defined in claim 20, wherein the peripheral area is folded back to form a U shape with the side wall.

23. The cell as defined in claim 17, wherein the layer of an alloy comprising copper, tin and zinc is disposed directly on the substrate.

24. The cell as defined in claim 17, wherein a strike layer comprising at least one metal or metal alloy and having a thickness no greater than 1 micrometer is disposed between the substrate and the alloy comprising copper, tin and zinc.

25. The cell as defined in claim 24, wherein the strike layer comprises nickel.

26. The cell as defined in claim 17, wherein the first layer of the alloy comprising copper, tin and zinc is 1 to 8 micrometers thick.

27. The cell as defined in claim 26, wherein the first layer of the alloy comprising copper, tin and zinc is at least 3 micrometers thick.

28. The cell as defined in claim 26, wherein the first layer of the alloy comprising copper, tin and zinc is no more than 5 micrometers thick.

29. An electrochemical battery cell comprising a positive electrode; a negative electrode comprising zinc; a separator disposed between the positive and negative electrode; an electrolyte comprising a solute and an aqueous alkaline solvent; and a cell housing containing the electrodes, separator and electrolyte; the housing comprising a metal positive electrode casing in contact with the positive electrode, a metal negative electrode casing in contact with the negative electrode and a seal member disposed between and electrically insulating the positive and negative casings for sealing the electrodes and electrolyte within the cell housing; wherein:
the negative electrode casing is formed from a metal substrate having a first major surface, a second major surface and an edge surface around the perimeters of the major surfaces;
the negative electrode casing has a shape with an exposed surface comprising at least portions of the first major, second major and edge surfaces;
at least the exposed surface of the negative electrode casing comprises a first layer of an alloy comprising copper, tin and zinc;
the exposed surface of the negative electrode casing further comprises a second layer of an alloy comprising copper, tin and zinc in which the relative amounts by weight of the copper, tin and zinc are from 55 to 85, from 9 to 30 and from 2.5 to 20, respectively, and a ratio of copper to tin in the second layer is lower than a ratio of copper to tin in the first layer.

30. The cell as defined in claim 29, wherein the cell is a button cell.

31. The cell as defined in claim 29, wherein the cell is a prismatic cell.

* * * * *

UNITED STATES PATENT AND TRADEMARK OFFICE
CERTIFICATE OF CORRECTION

| | | |
|---|---|---|
| PATENT NO. | : 7,632,605 B2 | Page 1 of 1 |
| APPLICATION NO. | : 11/408093 | |
| DATED | : December 15, 2009 | |
| INVENTOR(S) | : Guo et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 888 days.

Signed and Sealed this

Second Day of November, 2010

David J. Kappos
*Director of the United States Patent and Trademark Office*